（12） United States Patent
Siddiqui et al.

(10) Patent No.: US 11,091,944 B2
(45) Date of Patent: Aug. 17, 2021

(54) HINGED DEVICE

(71) Applicant: Microsoft Technology Licensing, LLC, Redmond, WA (US)

(72) Inventors: Kabir Siddiqui, Sammamish, WA (US); Scott Schenone, Seattle, WA (US); Tim Escolin, Seattle, WA (US); John Elstad, North Bend, WA (US); Kent Campbell, Issaquah, WA (US); Thitipant Tantasirikorn, Woodinville, WA (US); Karsten Aagaard, Monroe, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 288 days.

(21) Appl. No.: 15/938,757

(22) Filed: Mar. 28, 2018

(65) Prior Publication Data

US 2019/0301215 A1    Oct. 3, 2019

(51) Int. Cl.
| | |
|---|---|
| *E05D 11/10* | (2006.01) |
| *G06F 1/16* | (2006.01) |
| *E05D 5/04* | (2006.01) |
| *E05D 11/08* | (2006.01) |
| *E05D 3/18* | (2006.01) |

(52) U.S. Cl.
CPC ............ *E05D 11/1078* (2013.01); *E05D 3/18* (2013.01); *E05D 5/04* (2013.01); *E05D 11/081* (2013.01); *G06F 1/1616* (2013.01); *G06F 1/1618* (2013.01); *G06F 1/1681* (2013.01)

(58) Field of Classification Search
CPC ......... E05D 11/1078; E05D 3/18; E05D 5/04; E05D 11/1081; G06F 1/1616; G06F 1/1618; G06F 1/1681
See application file for complete search history.

(56) References Cited

U.S. PATENT DOCUMENTS

| | | |
|---|---|---|
| 3,229,323 A | 1/1966 | Herbert |
| 5,682,645 A | 11/1997 | Watabe et al. |
| 6,058,671 A | 5/2000 | Strickland |
| 6,085,388 A | 7/2000 | Kaneko |
| 7,472,459 B2 | 1/2009 | Lee et al. |
| 7,536,747 B2 | 5/2009 | Christeson et al. |
| 7,895,711 B2 | 3/2011 | Shen |

(Continued)

FOREIGN PATENT DOCUMENTS

WO      03056410 A1    7/2003

OTHER PUBLICATIONS

"International Search Report and Written Opinion Issued in PCT Application No. PCT/US2019/023492", dated Jun. 17, 2019, 11 Pages.

(Continued)

*Primary Examiner* — Victor D Batson
*Assistant Examiner* — Matthew J Sullivan
(74) *Attorney, Agent, or Firm* — Rainier Patents, P.S.

(57) ABSTRACT

The description relates to hinged devices, such as hinged computing devices. One example can include an expandable hinge assembly that rotatably secures a first portion and a second portion. The example can also include a hinge assembly positioned between the first portion housing and the second portion housing and that includes first and second rotatable links that are rotatable relative to both the hinge assembly and the first and second portions.

20 Claims, 14 Drawing Sheets

(56) References Cited

U.S. PATENT DOCUMENTS

| | | | |
|---|---|---|---|
| 8,024,841 B2 | 9/2011 | Shen | |
| 8,196,263 B2 | 6/2012 | Wang et al. | |
| 8,385,991 B2* | 2/2013 | Wang | E05D 3/18 |
| | | | 16/221 |
| 8,982,542 B2* | 3/2015 | Bohn | G06F 1/1681 |
| | | | 361/679.06 |
| 9,347,249 B2 | 5/2016 | Marshall et al. | |
| 9,388,614 B2* | 7/2016 | Hsu | E05D 3/12 |
| 9,534,432 B2* | 1/2017 | Lee | G06F 1/1681 |
| 9,563,236 B2 | 2/2017 | Rittenhouse | |
| 9,665,130 B2 | 5/2017 | Hu | |
| 9,791,256 B1 | 10/2017 | Beer | |
| 9,857,849 B1* | 1/2018 | Siddiqui | G06F 1/1616 |
| 10,100,970 B1* | 10/2018 | Wu | G06F 1/1681 |
| 10,241,548 B2* | 3/2019 | Tazbaz | G06F 1/1681 |
| 10,253,804 B2* | 4/2019 | Park | G06F 1/1681 |
| 10,344,510 B2* | 7/2019 | Siddiqui | E05D 11/00 |
| 10,364,598 B2* | 7/2019 | Tazbaz | G06F 1/1681 |
| 10,401,914 B2* | 9/2019 | Shang | G06F 1/1681 |
| 10,465,427 B2* | 11/2019 | Chen | E05D 11/10 |
| 10,488,882 B2* | 11/2019 | Maatta | G06F 1/1618 |
| 10,501,973 B2* | 12/2019 | Maatta | G06F 1/1681 |
| 2004/0134033 A1 | 7/2004 | Raines et al. | |
| 2008/0184527 A1 | 8/2008 | Chao | |
| 2009/0070961 A1* | 3/2009 | Chung | E05D 3/122 |
| | | | 16/354 |
| 2011/0072620 A1 | 3/2011 | Wang et al. | |
| 2015/0062793 A1 | 3/2015 | Chen et al. | |
| 2016/0010375 A1 | 1/2016 | Rittenhouse | |
| 2018/0059735 A1 | 3/2018 | Tazbaz et al. | |
| 2018/0066465 A1 | 3/2018 | Tazbaz et al. | |
| 2019/0056768 A1* | 2/2019 | Lin | G06F 1/1681 |
| 2019/0094917 A1* | 3/2019 | Schmelzle | E05D 5/14 |
| 2019/0155344 A1* | 5/2019 | Lin | G06F 1/1681 |
| 2019/0169897 A1 | 6/2019 | Jiang et al. | |
| 2020/0012322 A1* | 1/2020 | Jan | E05D 3/18 |
| 2020/0012323 A1* | 1/2020 | Huang | E05D 11/00 |
| 2020/0064890 A1 | 2/2020 | Siddiqui | |
| 2020/0326756 A1 | 10/2020 | Siddiqui et al. | |

OTHER PUBLICATIONS

"International Search Report and Written Opinion Issued in PCT Application No. PCT/US20/025617", dated Jun. 17, 2020, 13 Pages.

"Final Office Action Issued in U.S. Appl. No. 16/380,838", dated Jan. 29, 2021, 5 Pages.

"Non-Final Office Action Issued in U.S. Appl. No. 16/380,838", dated Jun. 26, 2020, 10 Pages.

* cited by examiner

HINGED DEVICE

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced. Where space permits, elements and their associated reference numbers are both shown on the drawing page for the reader's convenience. Otherwise, only the reference numbers are shown.

DESCRIPTION

The present concepts relate to devices, such as computing devices employing expandable hinge assemblies that can rotationally secure first and second device portions relative to a hinge axis, such as a first hinge axis that relates to the first portion and a second hinge axis that relates to the second portion. As the device portions are rotated to a closed position (e.g., closed book position), components of the device and/or foreign objects between the two portions can cause forces to be imparted on the hinge assembly that could damage the hinge assembly. The expandable nature of the hinge assembly can allow hinge ends of the first and second portions to move away from one another when exposed to these forces. The expansion can protect the hinge assembly and/or components, such as displays that are proximate to the hinge assembly.

Figure 1:
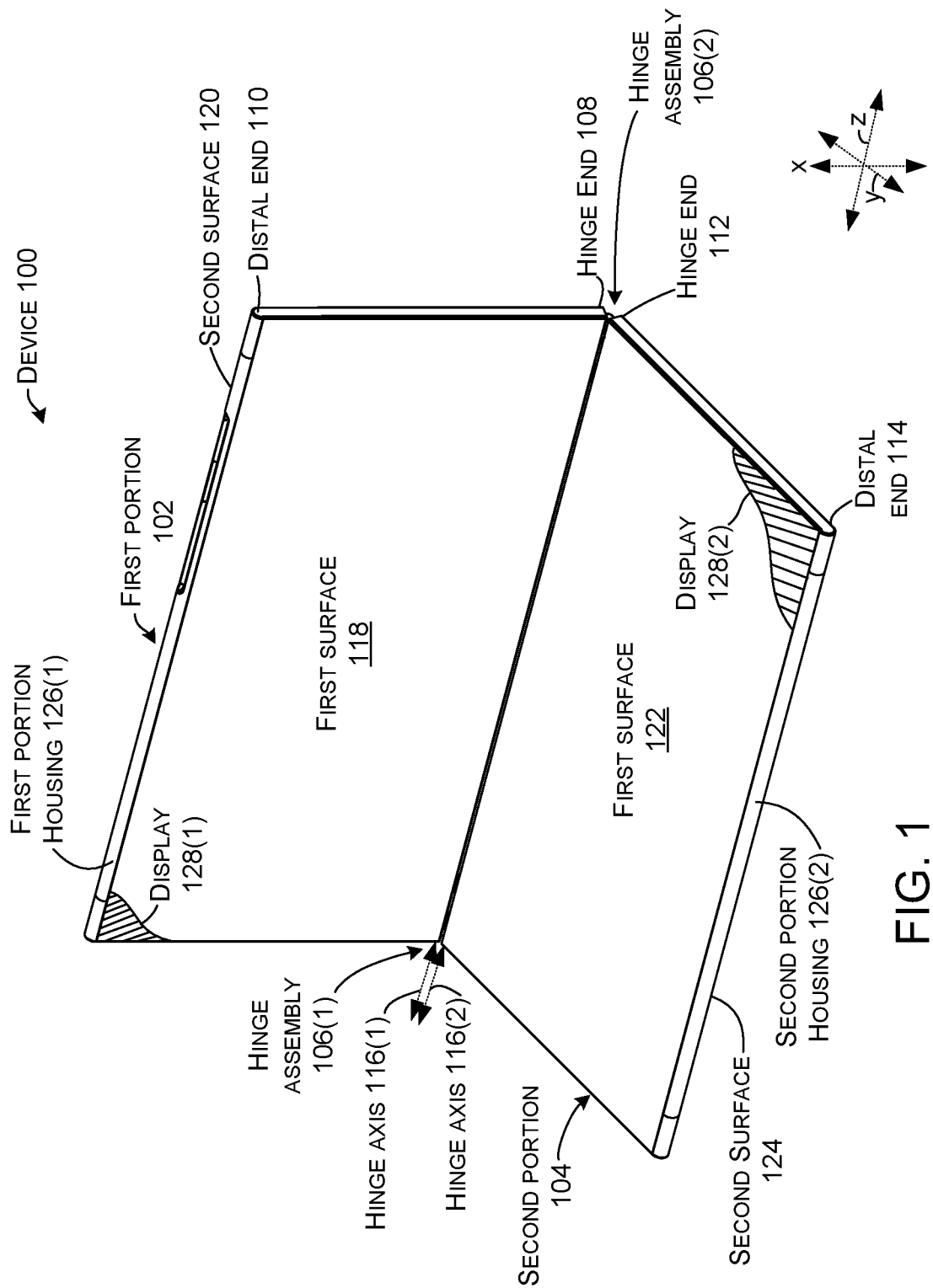
FIGS. 1, 2A, 2B, 3A, 4A, 5A, 6A, 7A, and 8A show perspective views of example devices in accordance with some implementations of the present concepts.

Introductory FIG. 1 shows an example device 100 that has first and second portions 102 and 104 that are rotatably secured together by hinge assemblies 106. In the illustrated implementation, two hinge assemblies 106(1) and 106(2) are employed (e.g., one near each end of the device), but other implementations could employ a single hinge assembly or more than two hinge assemblies.

The first portion 102 can extend from a hinge end 108 to a distal end 110. The second portion 104 also can extend from a hinge end 112 to a distal end 114. In this example, the hinge assemblies 106 can define two hinge axes 116. The first portion 102 can rotate around first hinge axis 116(1) and the second portion 104 can rotate around second hinge axis 116(2). The first portion 102 can include opposing first and second major surfaces 118 and 120 (hereinafter, first and second surfaces). Similarly, the second portion 104 can include opposing first and second major surfaces 122 and 124 (hereinafter, first and second surfaces). (Note the second surfaces 120 and 124 are facing away from the viewer and as such are not directly visible in this view, but are shown and designated in subsequent FIGS.).

In some implementations, the first portion 102 can include a first housing (e.g., first portion housing 126(1)) and the second portion 104 can include a second housing (e.g., second portion housing 126(2)). In the illustrated example, a display 128(1) is positioned on first portion housing 126(1) and display 128(2) is positioned on second portion housing 126(2). In this case, the displays 128 are positioned on the first surfaces 118 and 122, respectively. In other examples, the displays 128 can be positioned on the first and/or second surfaces 118, 120, 122, and/or 124, respectively.

Figure 2A:
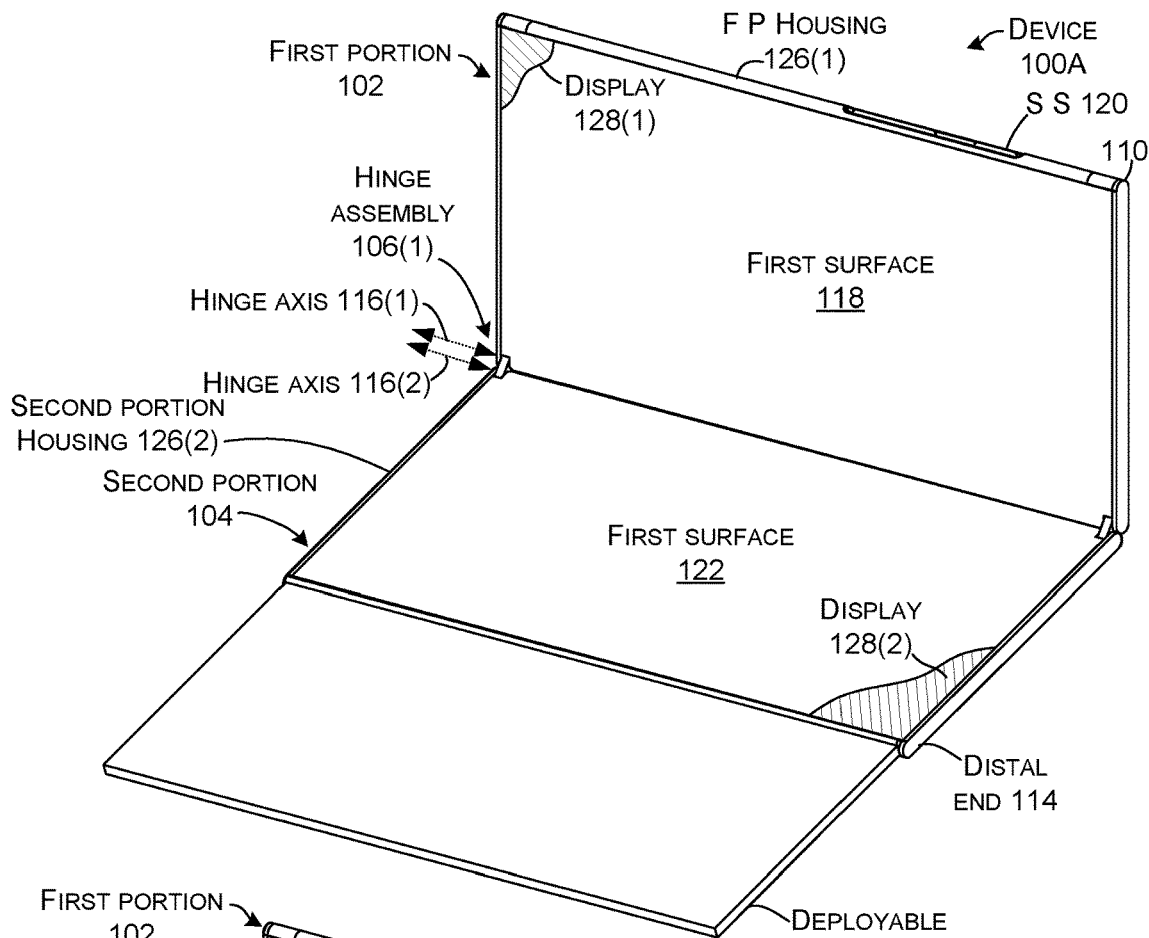
Figure 2B:
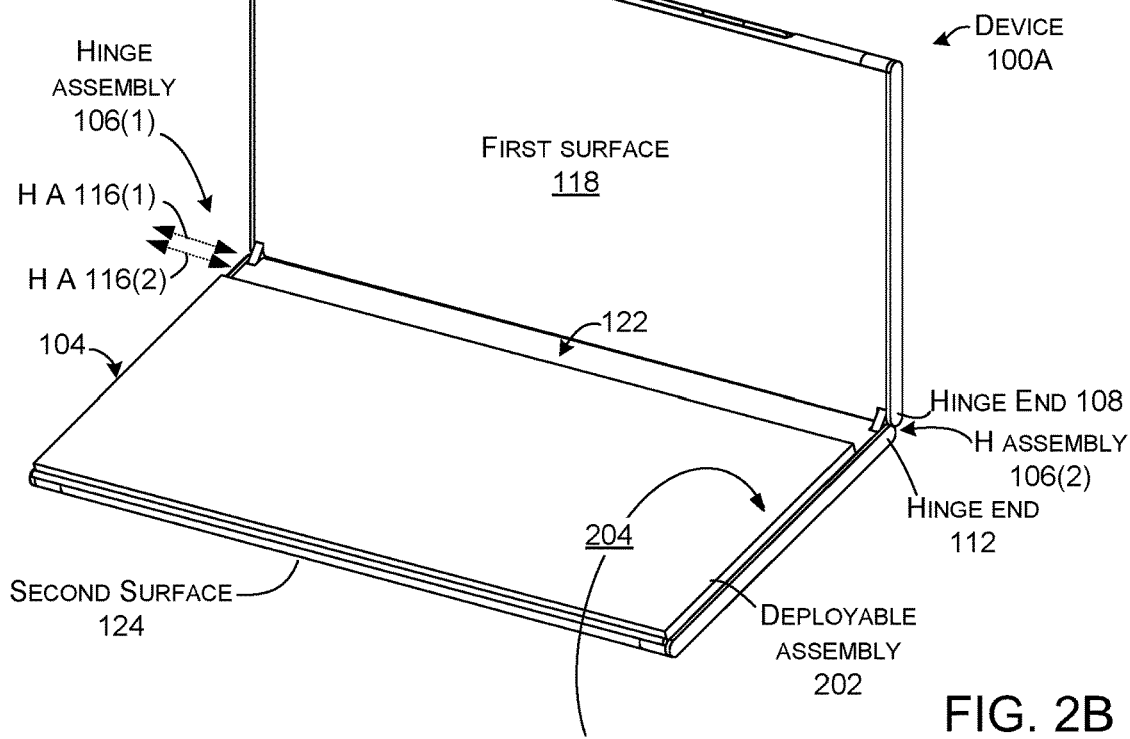

FIGS. 2A and 2B collectively show another device 100A. This device 100A is similar to device 100 of FIG. 1. Device 100A adds a deployable assembly 202. In this example, the deployable assembly 202 is hingedly attached to the distal end 114 of second portion housing 126(2). FIG. 2A shows the deployable assembly 202 deployed. FIG. 2B shows the deployable assembly rotated (as indicated by arrow 204) to a storage position against first surface 122 of second portion 104.

FIGS. 3A-8D collectively show details of example hinge assembly 106(1).

Figure 3A:
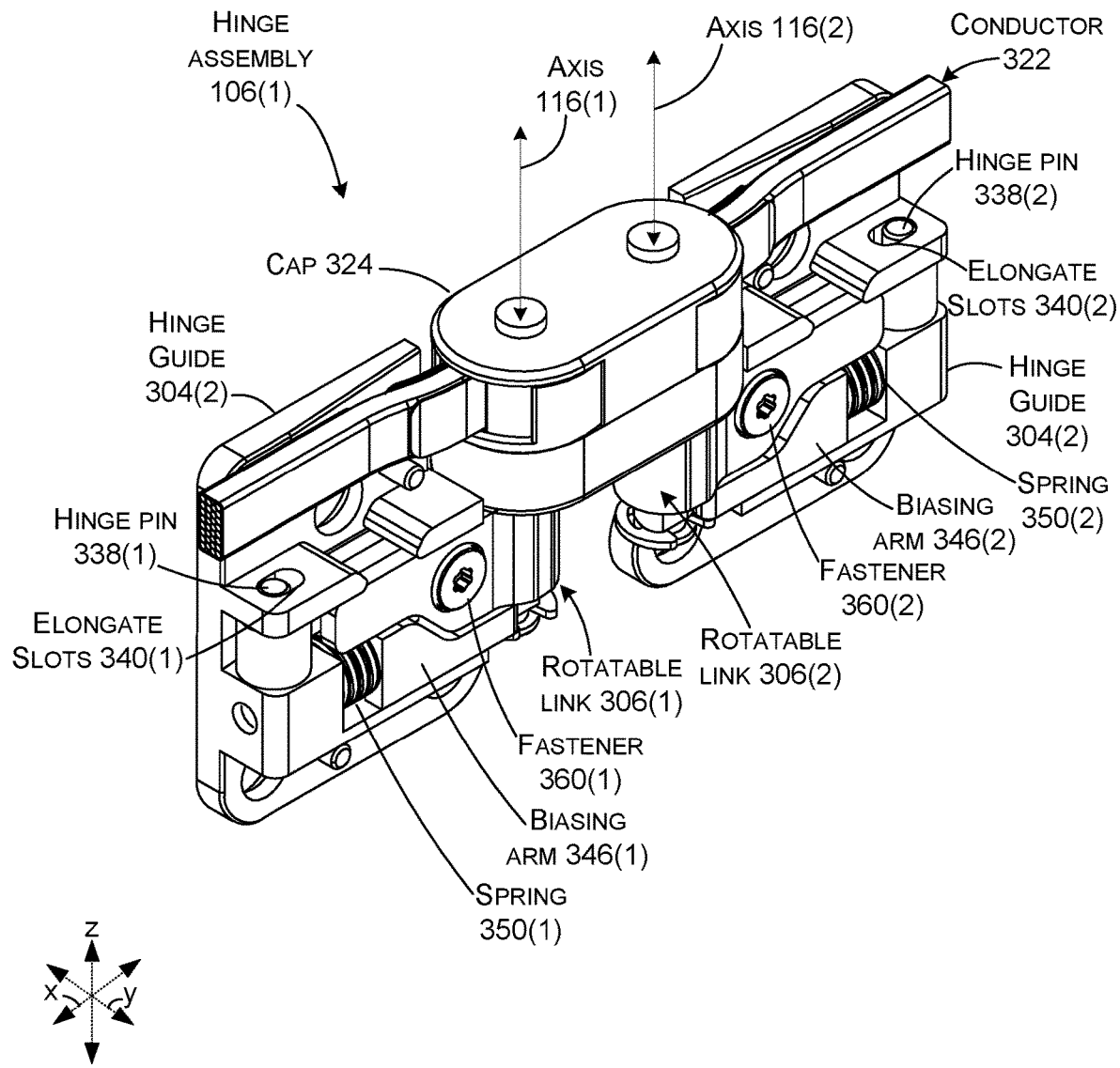
Figure 3B:
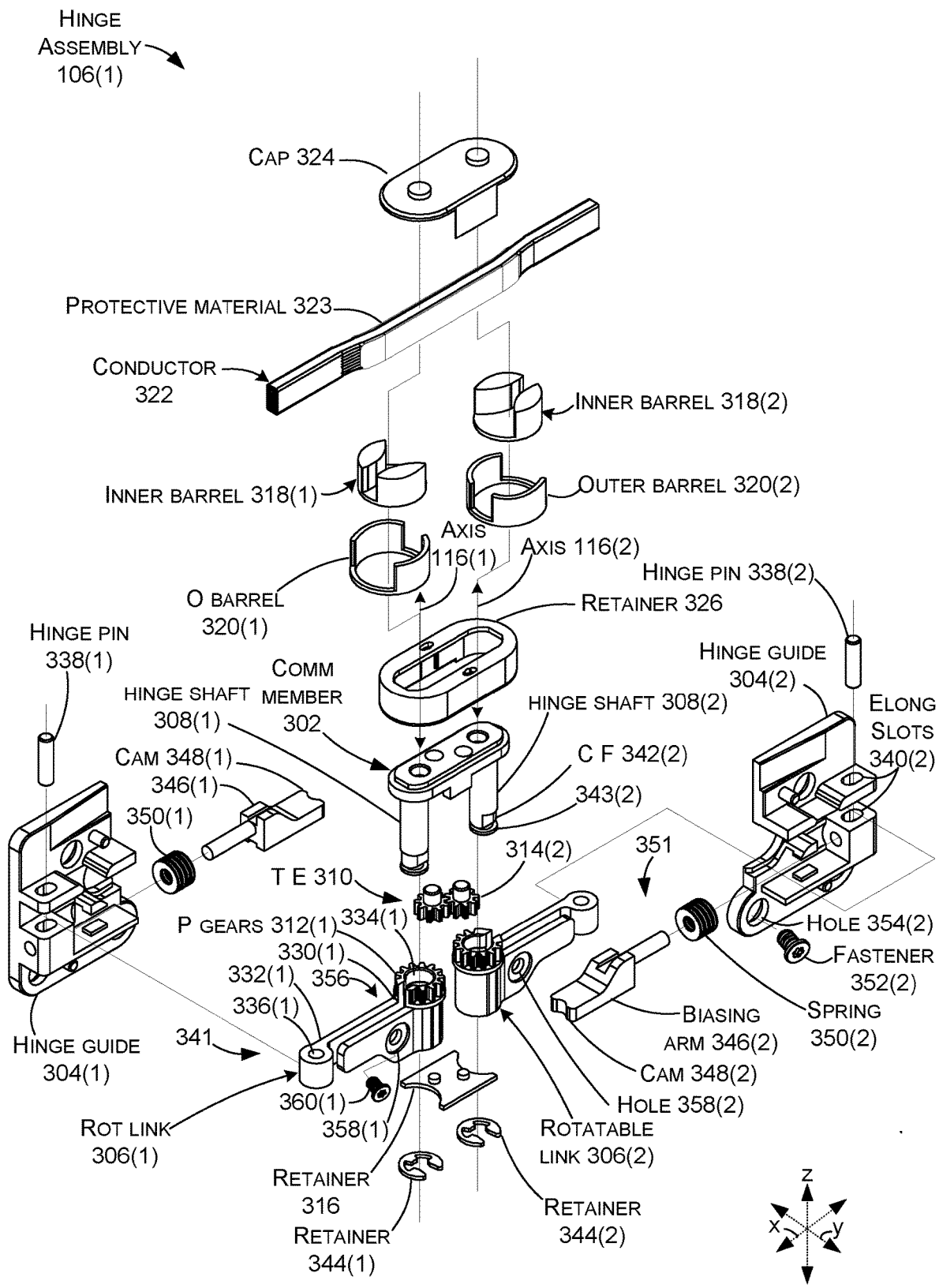
FIG. 3B shows an exploded perspective view of an example device in accordance with some implementations of the present concepts.

FIG. 3A is a perspective view of example hinge assembly 106(1) and FIG. 3B is an exploded perspective view of hinge assembly 106(1), both in the 180-degree orientation. The hinge assembly 106(1) can include a communication member 302, hinge guides 304, and rotatable links 306. The communication member 302 can define hinge shafts 308. The hinge shafts 308 can define hinge axes 116.

The hinge assembly 106(1) can also include a timing element 310 that synchronizes rotation (e.g., extent of rotation) of the first and second portions 102 and 104 around the first and second hinge axes 116. For instance, the timing element 310 can ensure that 20 degrees of rotation around the first hinge axis 116(1) simultaneously produces 20 degrees of rotation around the second hinge axis 116(2).

In the illustrated implementation, the timing element 310 can be manifest as intermeshing gears. For instance, the rotatable links 306 can define primary gears 312 (only 312(1) labeled due to space constraints) that can interact with intervening or secondary gears 314 (only 314(2) labeled due to space constraints). The secondary gears 314 are rotatably secured relative to primary gears 312 by retainer 316 that can retain the secondary gears 314 relative to the communication member 302.

The communication member 302 can also receive nested inner and outer barrels 318 and 320 in a rotational relation (e.g., the inner and outer barrels are secured relative to the communication member and can rotate around the hinge axes 116. A conductor 322, such as traditional insulated wire(s)s and/or a flexible printed circuit(s) (FPC) can pass from portion 102 through the inner and outer barrels 318 and 320 and to the second portion 104. The conductor can be associated with a protective material 323. The protective material can provide abrasion resistance to the conductor, maintain cross-sectional integrity of the conductor (e.g., keep a rectangular conductor rectangular), and/or influence bending characteristics of the conductor to reduce pinching/binding. In the illustrated configuration, the protective material 323 is manifest as metal strips on both sides of the conductor 322. The conductor 322 can be retained by a cap 324, which secures to retainer 326 over the inner barrels 318, and outer barrels 320. The retainer 326 in turn can be secured to the communication member 302.

The rotatable links 306 can be elongate and extend from a first end 330 to a second end 332. The first end 330 can define an aperture 334 and the second end 332 can define an aperture 336. (These elements are only designated relative to link 306(1) in FIG. 3B due to space constraints on the drawing page). The hinge shafts 308 can pass through apertures 334. The second apertures 336 can receive hinge pins 338. The hinge pins can pass through a pair of spaced apart elongate slots 340 in the hinge guides 304 and aperture 336 of the rotatable link 306. Stated another way, the hinge pins 338 first pass through one of the spaced apart elongate slots 340, then the aperture 336 on the second end 332 of the rotatable link and then the other of the spaced apart elongate slots 340. Thus, the hinge pins 338 can retain the rotatable links 306 to the hinge guides 304, while allowing the rotatable link to rotate relative to the hinge guide and to move toward and away from the hinge axis by an amount defined by a length of the elongate slots. In this case, the rotatable links 306 are secured to an intermediary element (e.g., hinge guides 304). The hinge guides are in turn secured to the first and second portion housings. In other cases, the rotatable links can be rotatably secured directly to the first and second portion housings.

From one perspective, the rotatable links 306, hinge shafts 308, and/or hinge pins 338 can be viewed as an example of a dual rotation assembly 341. The dual rotation assembly 341 can allow relative movement between the hinge axes and the first portions while maintaining their relative orientations (e.g., moving from parallel and co-extensive to parallel and not co-extensive).

The hinge shafts 308 can protrude through the rotatable links 306. The protruding portion of the hinge shafts can include cam followers 342 (only 342(2) labeled due to space constraints) and terminal ends 343. The terminal ends can be secured by retainers 344. The cams followers 342 can be engaged by cams 348 on biasing arms 346. The biasing arms 346 can extend from the cam followers 342 to hinge guides 304. The biasing arms 346 can be biased by springs 350 or other biasing elements/mechanisms. In this case, the biasing arms 346 extend through the springs 350 into the hinge guides 304 and thereby retain the springs. In turn, the springs 350 bias the biasing arms 346 away from the hinge guides 304 and toward the cam followers 342 on the hinge shafts 308. From one perspective, the cams followers 342, cams 348, biasing arms 346, and/or springs 350 can be viewed as an example of an orientation biasing assembly 351. The orientation biasing assembly 351 can be configured to bias the first and second portions toward, and/or to maintain specific orientations between, the first and second portions (102, 104, FIG. 1).

The hinge guides 304 can be fixedly secured to the respective first and second portion housings (FIGS. 1, 102 and 104) with fasteners 352 that pass through holes 354 (not all of which are designated with specificity) and connect to the portion housings. Further, the distance between the hinge shafts 308 is also fixed (e.g., the distance between hinge shaft 308(1) and hinge shaft 308(2) does not change during rotation of the first and second portions). The rotatable links 306 can also allow relative movement between the hinge assembly 106 and first and second portion housings 126. Rotatable link 306(1) is secured to hinge guide 304(1) by hinge pin 338(1). The hinge pin itself can move linearly relative to the hinge guide 304(1) as defined by a length of elongate slots 340(1). Similarly, rotatable link 306(2) is secured to hinge guide 304(2) by hinge pin 338(2). The hinge pin itself can move linearly relative to the hinge guide 304(2) as defined by a length of elongate slots 340(2).

At its opposite end, rotatable link 306(1) can rotate around hinge shaft 308(1) and rotatable link 306(2) can rotate around hinge shaft 308(2). Thus, the rotational links can provide rotational and linear movement between the hinge shafts 308 and the hinge guides 304 (and hence the first and second portion housings 126).

In the illustrated implementation, the rotatable links 306 include a tension adjustment mechanism 356 that can control an amount of friction between aperture 334 and hinge shaft 308. In this case, the rotatable links bend back on themselves at apertures 334. Stated another way, the rotatable links can have a hairpin shape. Holes 358 can receive a threaded fastener 360 that can be used to adjust a gap G (see FIG. 4D) to increase or decrease the friction at the aperture 334 (e.g., between the aperture and the hinge shaft 308) to perform the function of the tension adjustment mechanism 356.

Stated another way, gap G can represent a diameter of aperture 334. Hinge shaft 308 passes through aperture 334. The hinge shaft 308 can have a diameter D. Gap G can be adjusted with fastener 360 to control the amount of interference and hence friction between the hinge shaft and the rotatable link. For example, tightening fastener 360 can decrease gap G and increase interference with the hinge shaft 308.

This interference can cause the hinge portions to maintain a given orientation, such as 135 degrees between the first and second portions (FIGS. 1, 102 and 104) set by the user. Then if the user wants to change the orientation, the user can supply enough force to rotate the first and second portions, but they do not rotate on their own without this external force. The fasteners 360 can be adjusted during device assembly so that the device rotates within a predefined torque range.

Figure 4A:
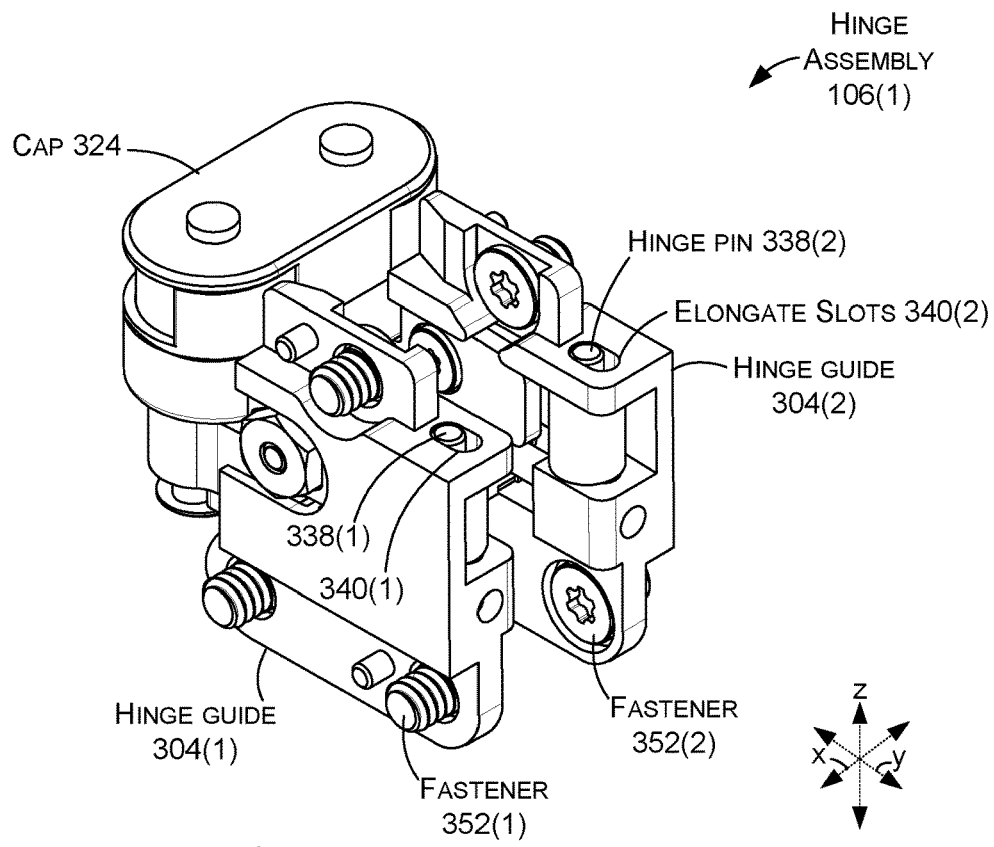
Figure 4B:
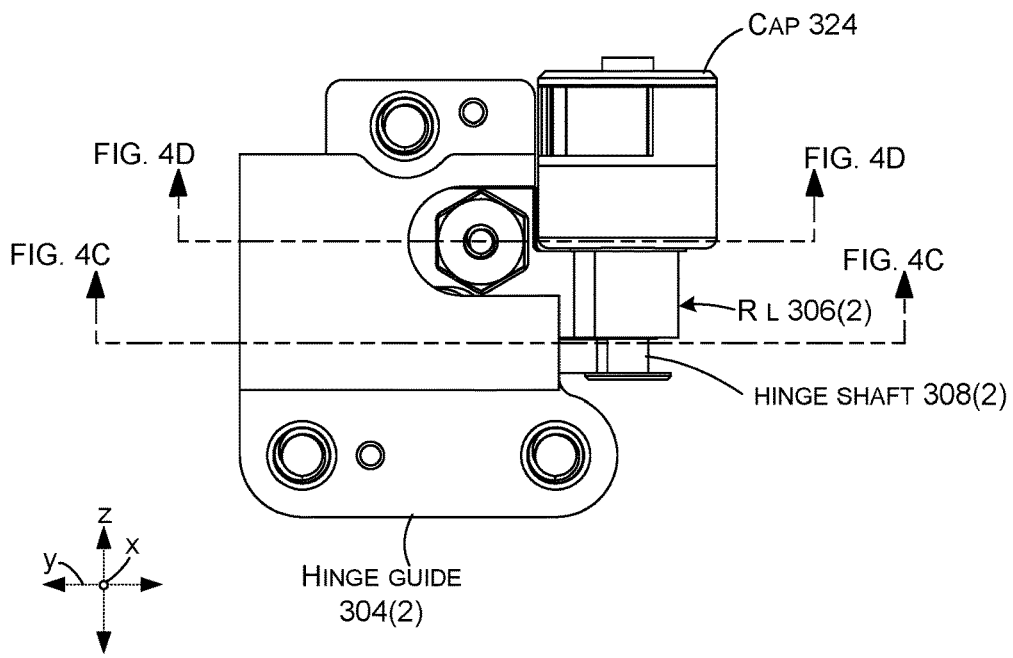
FIGS. 4B, 5B, 6B, 7B, and 8B show elevational views of example devices in accordance with some implementations of the present concepts.
Figure 4C:
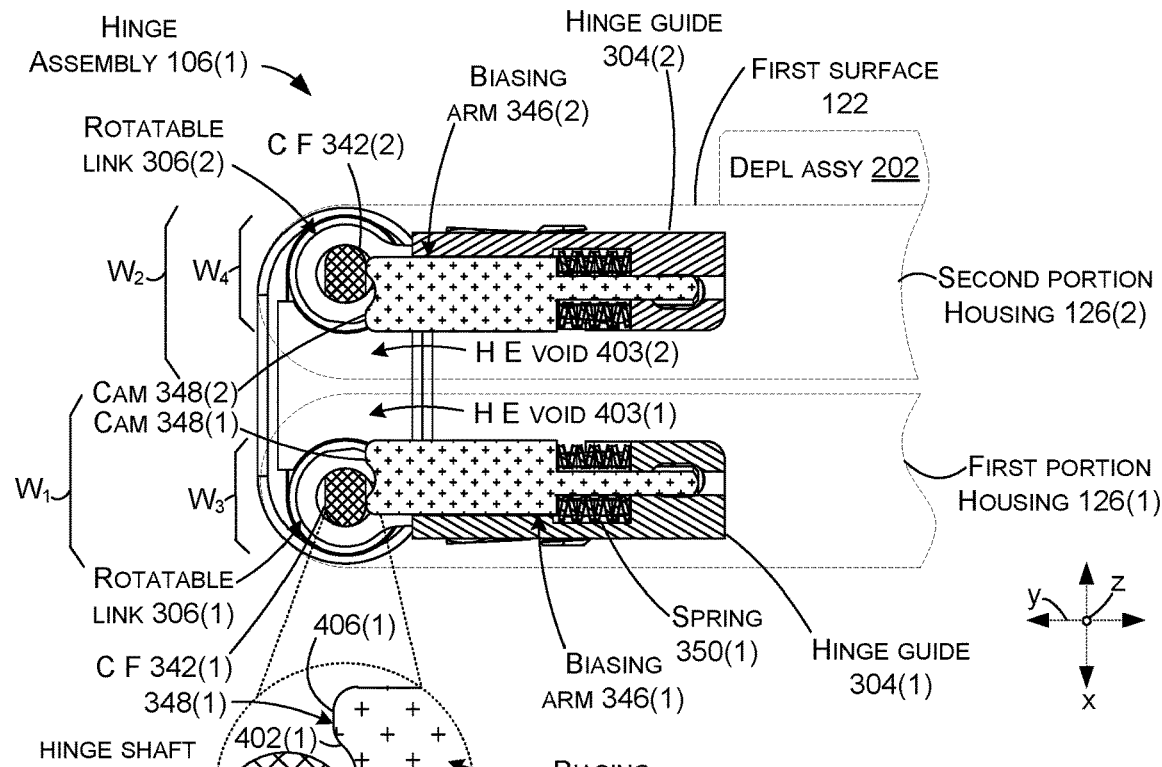
FIGS. 4C-4D, 5C-5D, 6C-6D, 7C-7D, and 8C-8D, show sectional views of example devices in accordance with some implementations of the present concepts.

FIG. 4C shows springs 350 biasing the biasing arms 346 toward hinge shafts 308. In this case, the biasing arms' cams 348 include an arcuate recess 402 positioned between two extended lobes 404 and 406. At this orientation, the lobes 404 are contacting elongate flattened sides 408 of the cam followers 342 resulting in mild compression of spring 350.

Figure 4D:
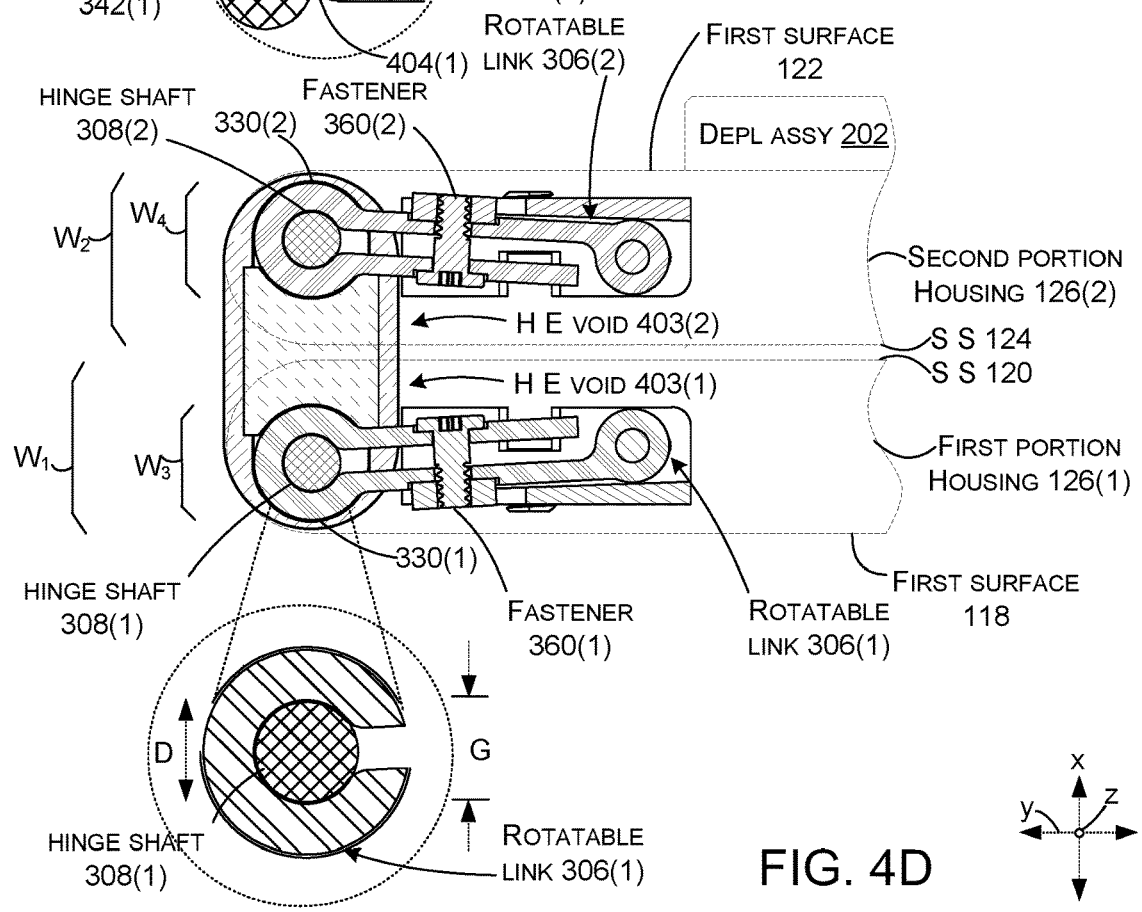

FIGS. 4C and 4D show the first portion housing 126(1) can define a first hinge end void 403 of a first width $W_1$ (e.g., open space between first surface 118 and second surface 120). Similarly, the second portion housing 126(2) can define a second hinge end void 403(1) of a second width $W_2$ (e.g, open space between first surface 122 and second surface 124). The hinge assembly 106 as measured at the rotatable link 306(1) around hinge shaft 308(1) can have a third width $W_3$ that is less than the first width $W_1$. The hinge assembly 106 as measured at the rotatable link 306(2) around hinge shaft 308(2) can have a fourth width $W_4$ that is less than the second width $W_2$.

As will be described below relative to FIGS. 5D-8D, this difference in width (e.g., $W_1$ versus $W_3$) can allow relative movement of the first portion housing 126(1) relative to the hinge assembly 106 (e.g., relative to hinge shaft 308(1)). The difference in width (e.g., $W_2$ versus $W_4$) can allow relative movement of the second portion housing 126(2) relative to the hinge assembly 106 (e.g., relative to hinge shaft 308(2)). This relative movement can protect the hinge assembly 106 from damage during rotation as will be explained in more detail below.

FIGS. 5A-5D show the hinge assembly at a 90-degree orientation (e.g., 45-degrees of rotation around each hinge axis 116 from the zero-degree orientation of FIGS. 4A-4C).

Figure 5A:
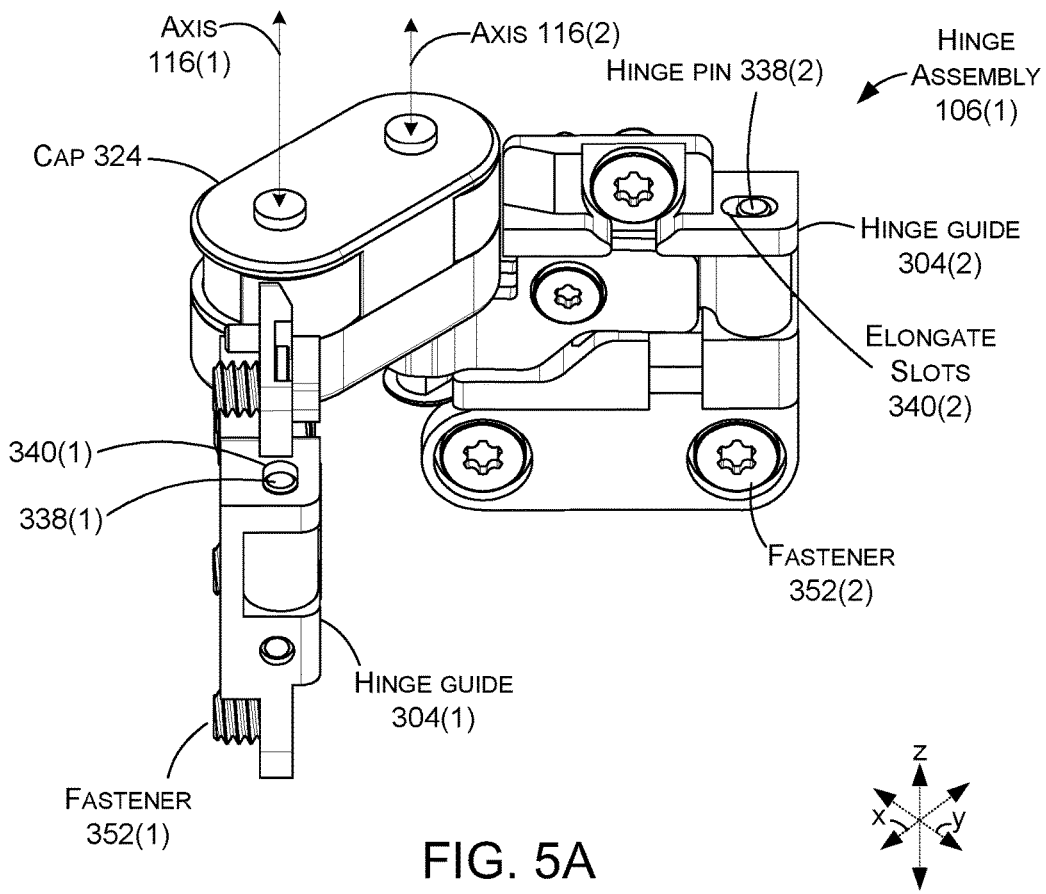
Figure 5B:
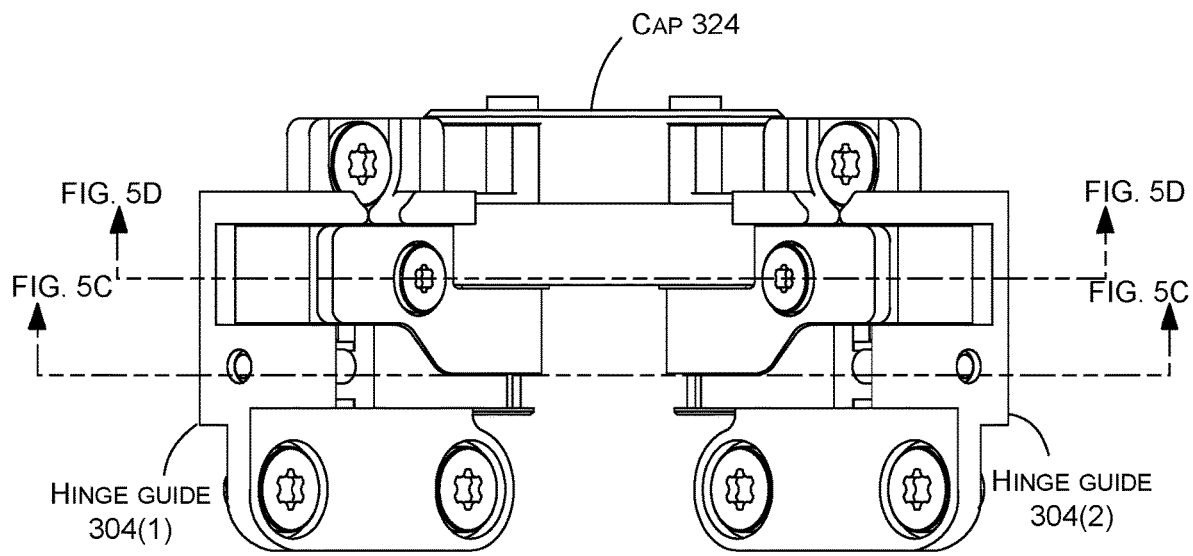
Figure 5C:
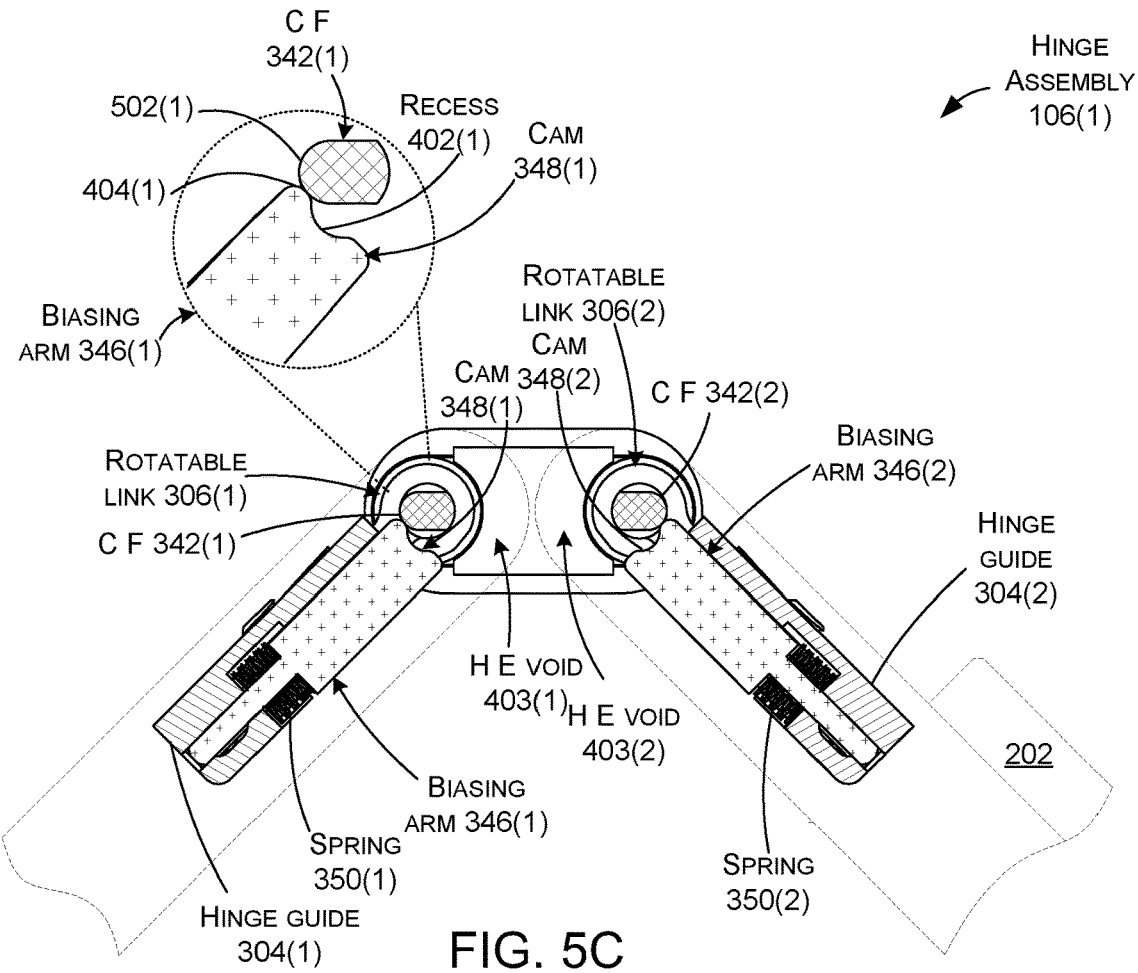
Figure 5D:
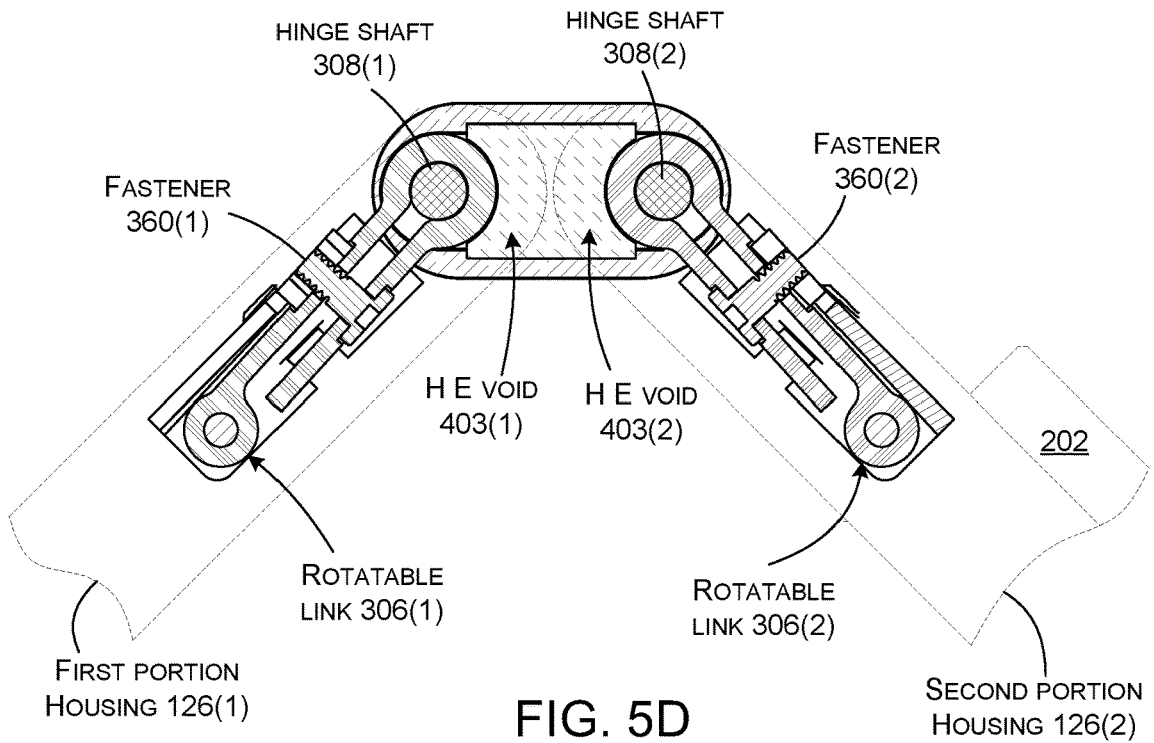
Figure 6A:
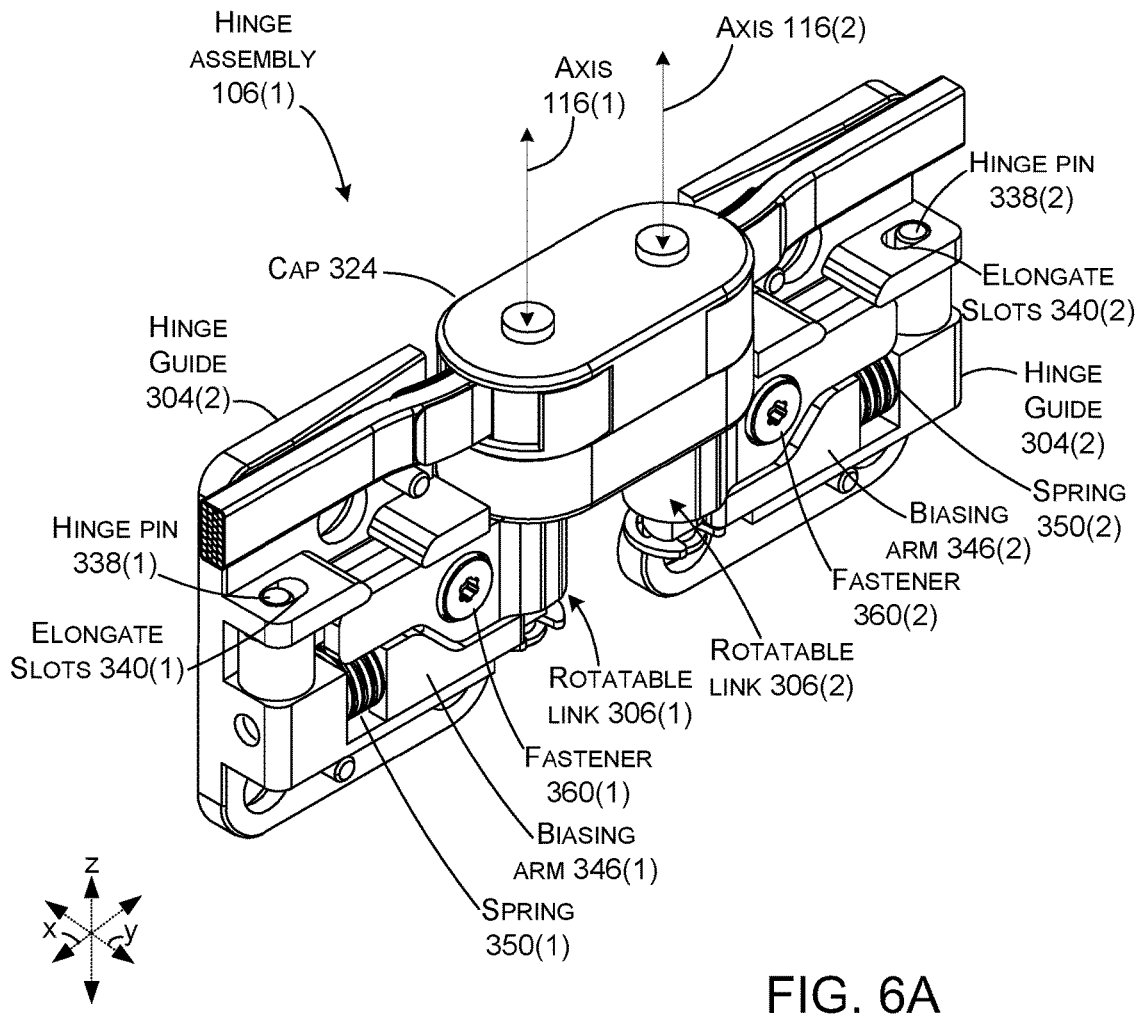
Figure 6B:
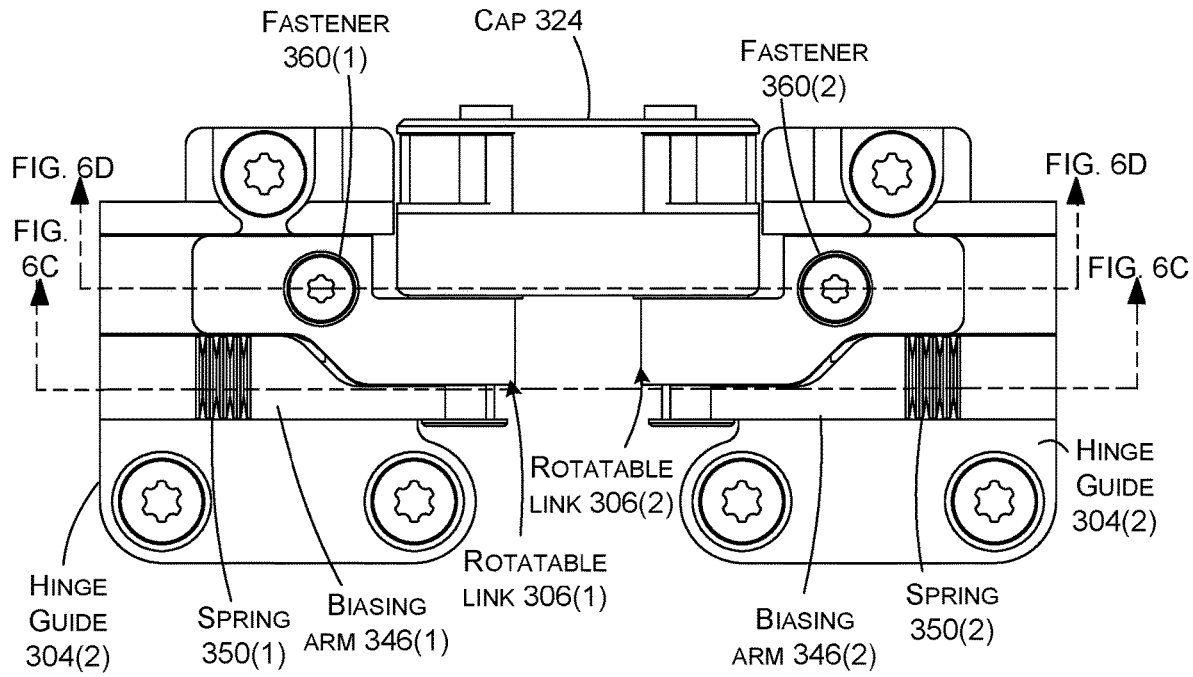
Figure 6C:
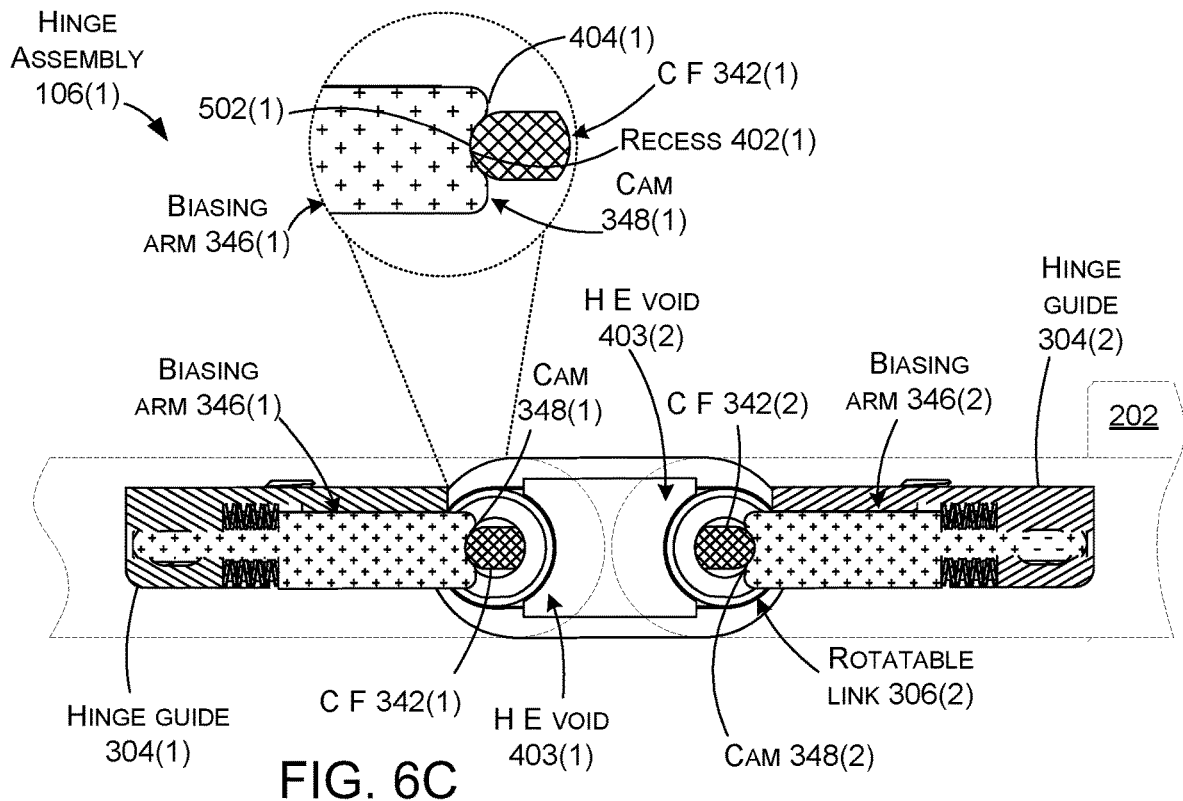
Figure 6D:
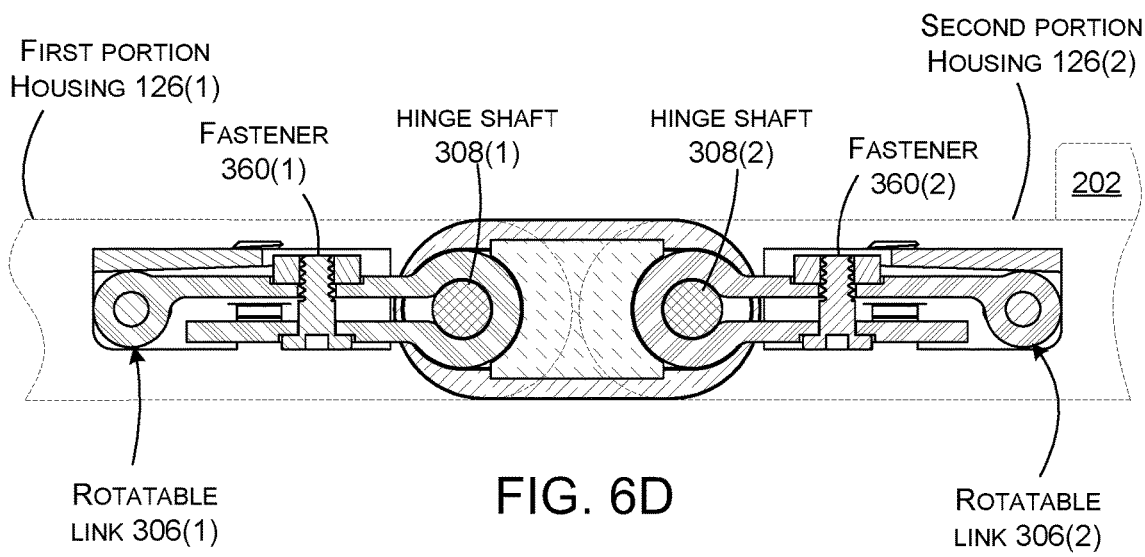

FIG. 5C shows cam lobes 404 contacting rounded ends 502 of cam followers 342. This contact forces the biasing arms 346 away from the hinge axes 116 and substantially compresses springs 350 (e.g., springs are more compressed than in zero-degree orientation). This highly compressed state of springs 350 can be viewed as a high potential energy state (e.g., a relatively large amount of energy is stored in the springs) when compared to the zero-degree orientation of FIGS. 4A-4D (and the yet to be discussed 180-degree orientation of FIGS. 6A-6D).

As rotation continues this potential energy, combined with the cam profile leading from lobe 404(1) to recess 402(1) can bias the hinge assembly 106(1) toward the 180-degree orientation. For instance, at about 150 degrees, the curved ends 502 of cam followers 342 start to transition from cam lobes 404 to cam recesses 402. At this point, the potential energy in the springs 350 can cause the biasing arm to rotate to the 180-degree orientation (via conversion of potential energy in the spring to kinetic energy moving the biasing arm). Thus, the hinge arm can rotate automatically from the high potential energy state at 150 degrees to the relatively low potential energy state at 180 degrees. A similar process can occur from 210 degrees to 180 degrees. The degree ranges listed here are provided only for purposes of explanation. The degree ranges involved in this automatic movement and bias toward the 180-degree orientation can be selected based upon the width and shape of the cam lobes 404 and 406 and/or cam recesses 402.

FIGS. 6A-6D show the hinge assembly at a 180-degree orientation (e.g., 90-degrees of rotation around each hinge axis 116 from the zero-degree orientation of FIGS. 4A-4C). As mentioned above, the hinge assembly is configured to automatically rotate to the 180-degree orientation as the first and second portions (102 and 104, FIG. 1) are rotated toward this 'open' orientation.

This particular implementation can achieve this automatic rotation via the shape of the cams 348 and/or cam followers 342 as well as the spring force biasing them toward one another. This implementation can also be biased to maintain this 180-degree orientation based on the cam shape and the corresponding cam follower shape. Further, the elongate slots 340 can allow lateral movement (orthogonal toward and away from the hinge axes 116) of the rotatable links 306 relative to the hinge guides 304. This lateral movement can allow full engagement of the cams 348 and cam followers 342. This creates a bias to maintain this 180-degree orientation in that rotation in either direction takes an input of energy to compress the springs 350.

FIGS. 7A-7D show the hinge assembly at about a 350-degree orientation (e.g., 175-degrees of rotation around each hinge axis 116 from the zero-degree orientation of FIGS. 4A-4C).

Figure 7A:
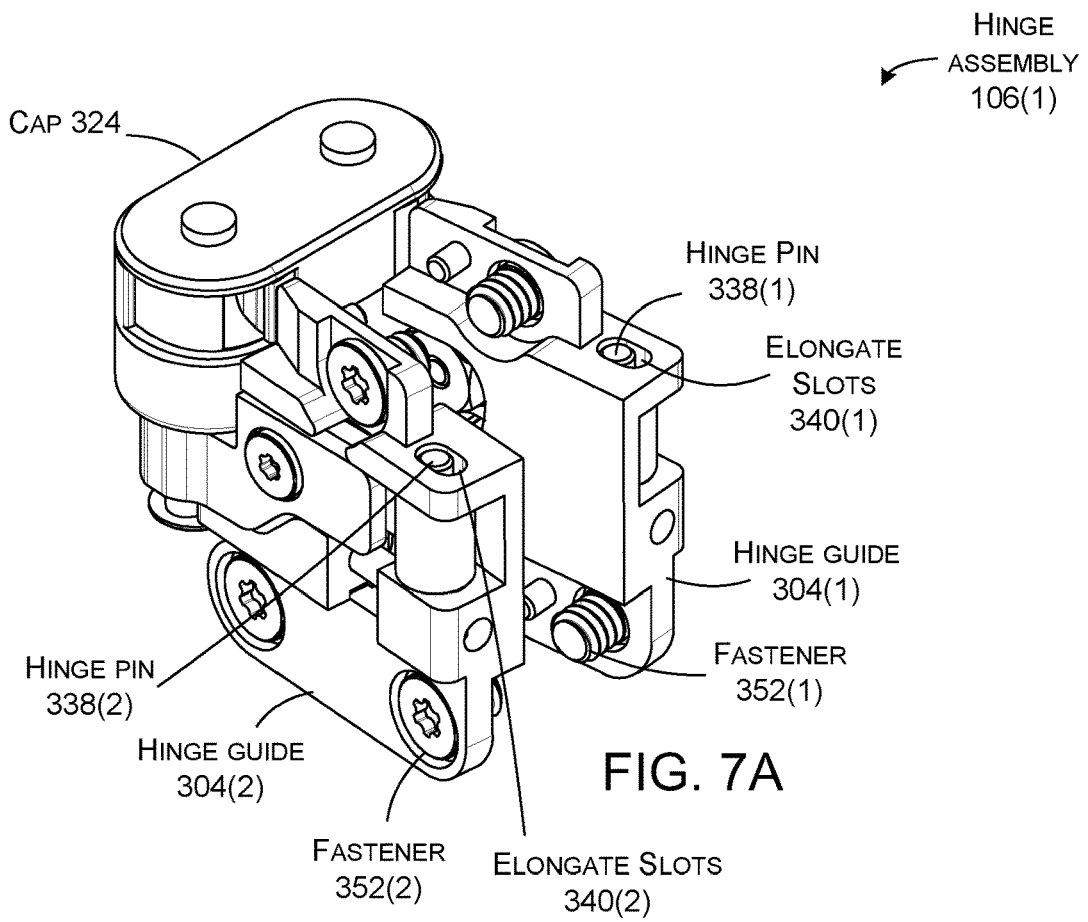
Figure 7B:
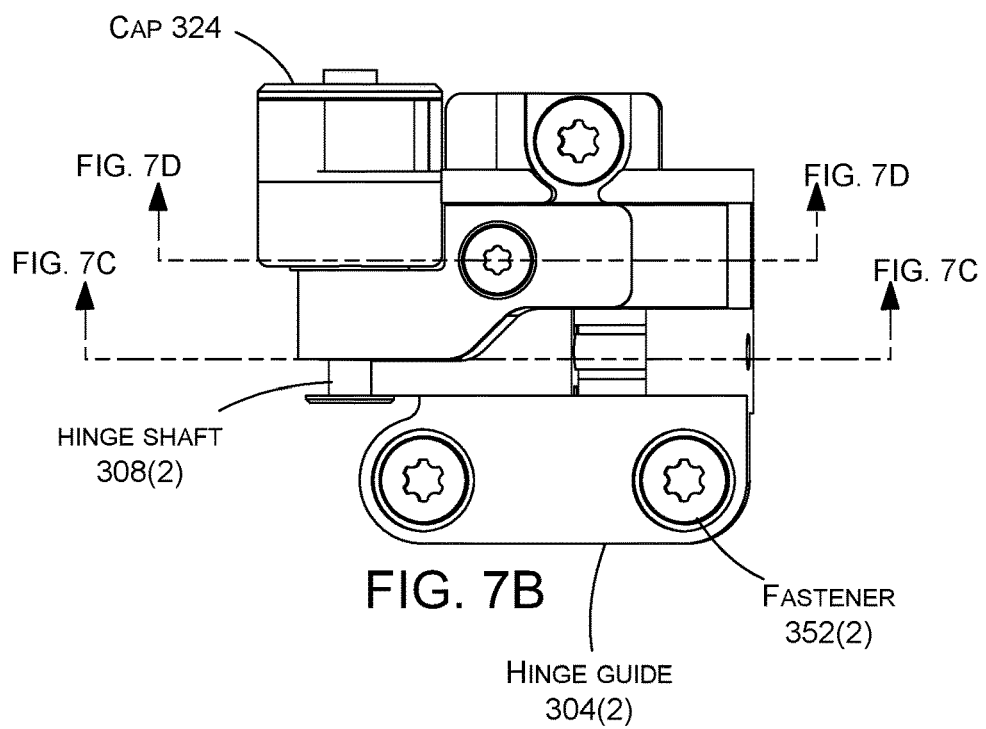
Figure 7C:
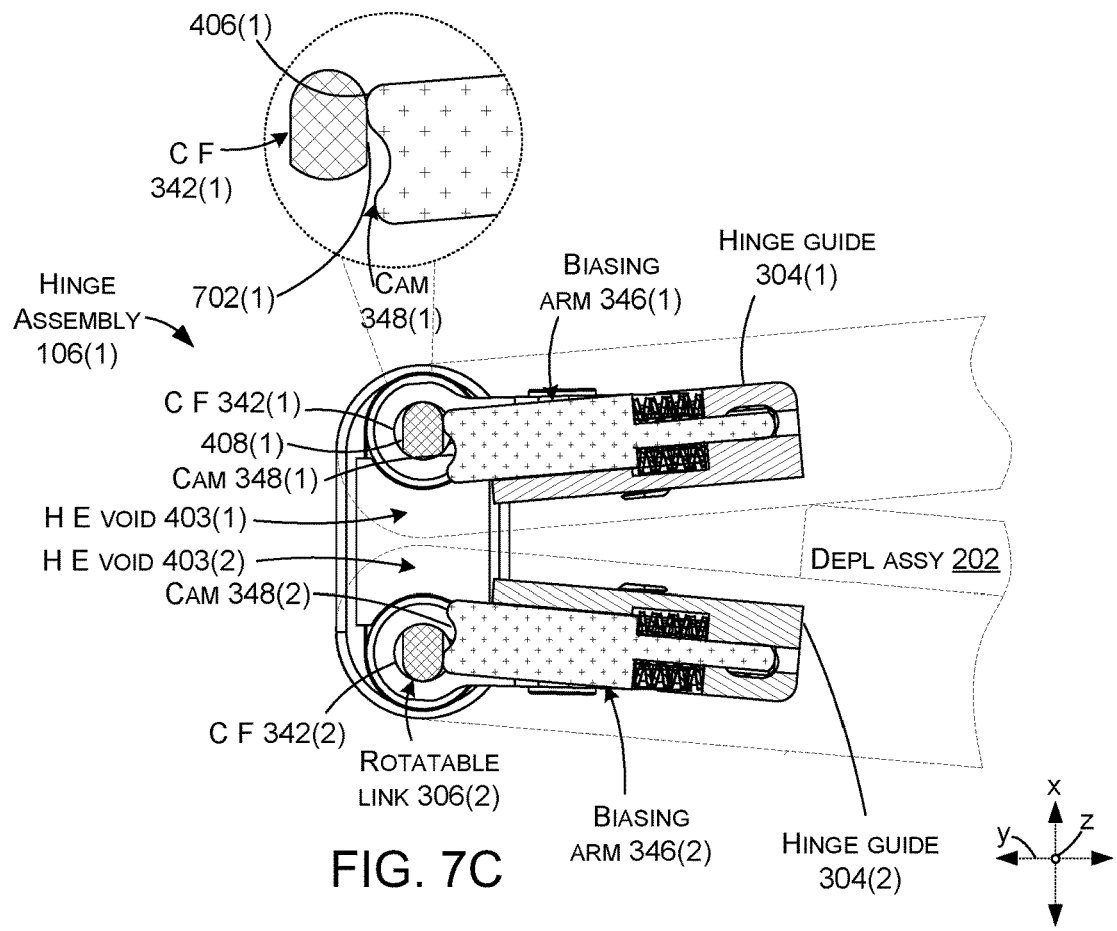

FIG. 7C shows that biasing arms 346 are still in contact with the cam followers 342 of the hinge shafts 308. Specifically, cam lobes 406 of cams 348 are contacting elongate flattened sides 702. This is similar to FIG. 4C where cam lobes 404 contacted elongate flattened sides 408. This contact forces the biasing arms 346 slightly back from the hinge axes 116 and mildly compresses springs 350.

Figure 7D:
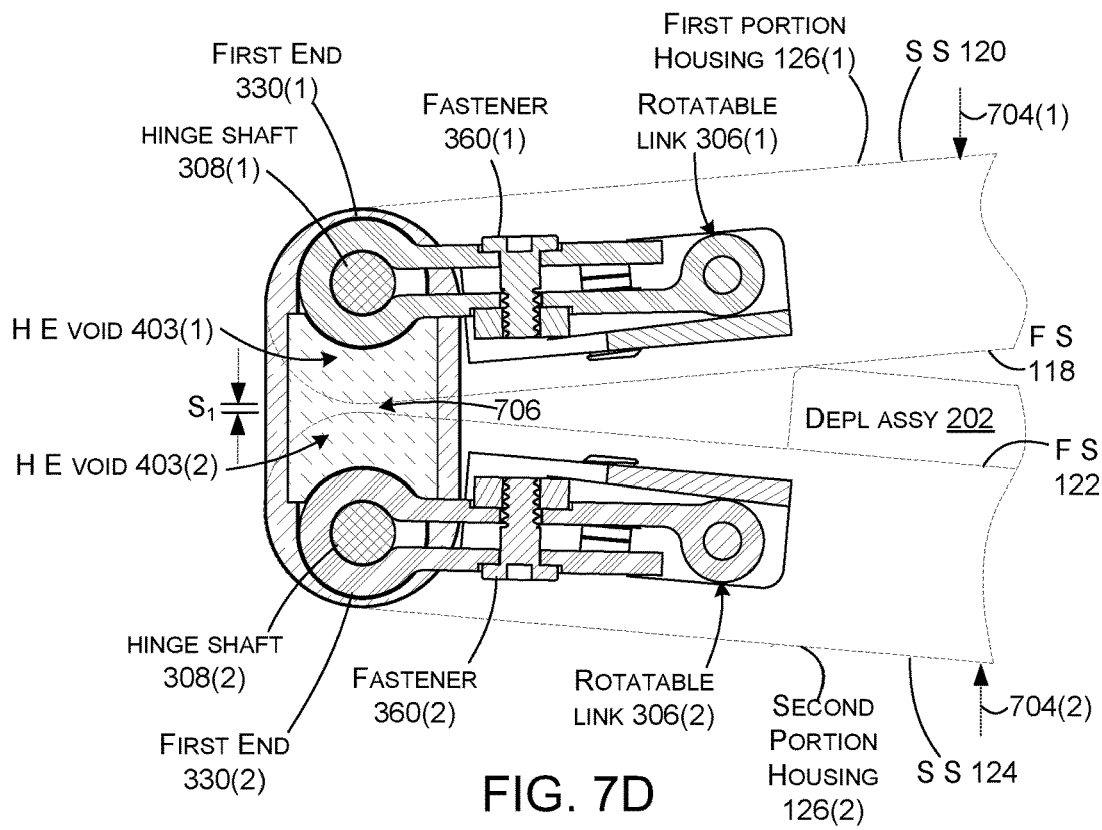

At this orientation, as seen in FIGS. 7C and 7D, deployable assembly 202 on second portion housing 126(2) is beginning to contact the first portion housing 126(1). Any forces, such as those indicated by arrows 704, to cause further rotation of the first and second portions can stress the hinge assembly 106(1) and/or portion housings 126. Traditionally, such forces where likely to damage the hinge assembly and produce catastrophic failure of one or more hinge assembly elements and/or other device elements. However, the present expandable hinge assembly implementations can reduce or eliminate such damage.

Note in FIG. 7D that the first ends 330 of rotatable links 306 are proximate to the second surfaces 120 and 124 of portion housings 126. Stated another way, the hinge end voids 403 are centrally located (e.g., between the hinge shafts 308). Further, as indicated at 706, the hinge ends of first surfaces 118 and 122 are very close to one another (touching or almost touching in some implementations). This distance or space is represented as $S_1$.

FIGS. 8A-8D show how hinge assembly 106(1) can reduce stress build-up that could otherwise compromise the integrity of the device 100. As forces represented by arrows 704 are applied to the first and second portion housings 126, the deployable assembly 202 can function as a fulcrum. With the deployable assembly acting as a fulcrum, forces represented by arrows 804 are experienced by the hinge ends 108 and 112 of the first and second portion housings 126 and the hinge assembly 106(1).

In a traditional hinge design, forces 804 could result in a failure of the device. However, hinge assembly 106(1) can expand when exposed to forces 804 to reduce or eliminate any damage. In this particular implementation, rotation at both ends of rotatable links 306 can allow relative movement between the portion housings 126. Specifically, the rotatable links' first ends 330 can rotate around hinge shafts 308. The rotatable links' second ends 332 can rotate around hinge pins 338. The hinge pins are fixed relative to the portion housings 126 (via hinge guides (304, FIG. 3B)) and the hinge shafts are fixed relative to one another by the communication member (302, FIG. 3B). However, by being able to rotate at both ends, the rotatable links 306 allow the hinge ends 108 and 112 of the first and second portion housings 126 to move away from one another (the overall device dimensions expand at the hinge assembly).

Figure 8A:
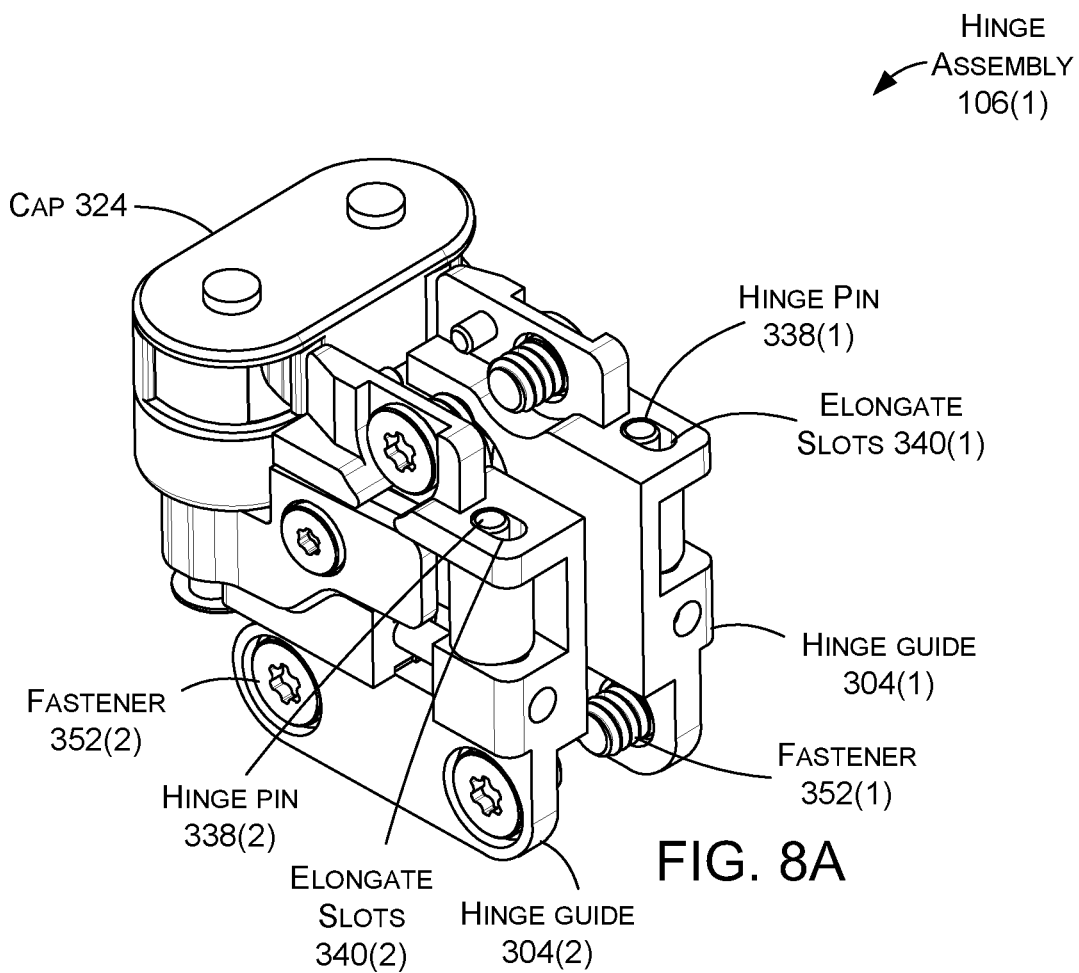
Figure 8B:
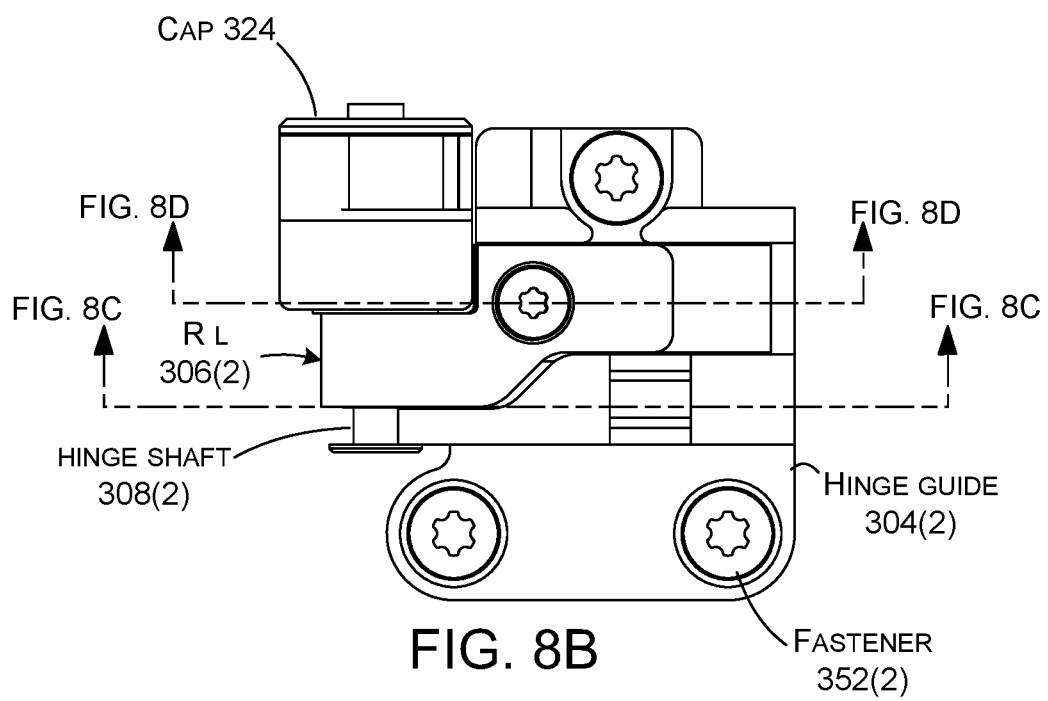
Figure 8C:
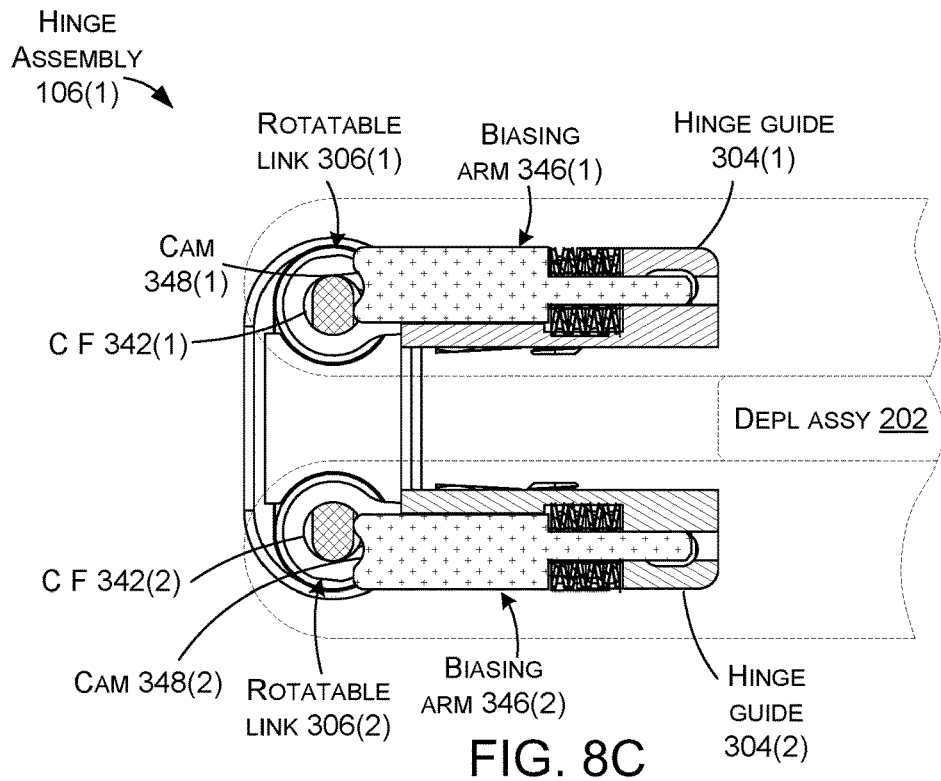
Figure 8D:
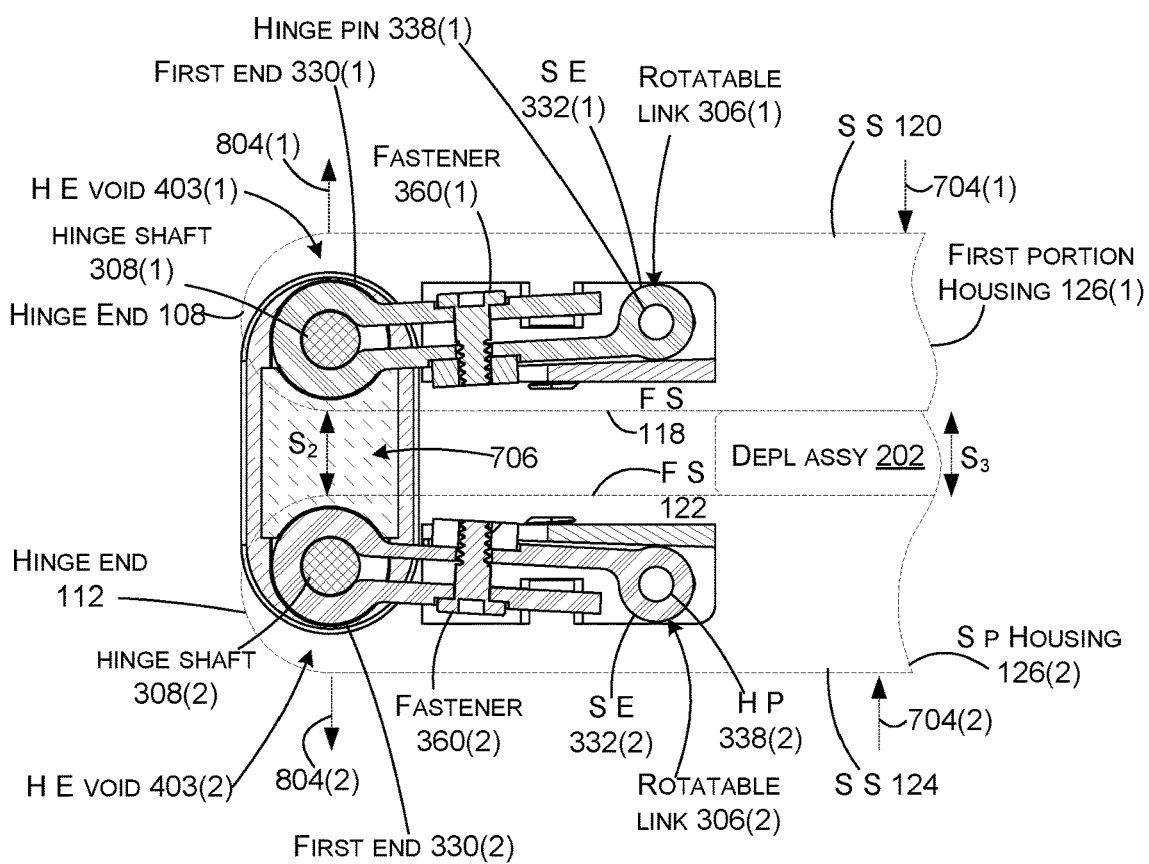

This hinge expansion is evident in FIG. 8D by comparing the distance or space represented as $S_2$ between the first surfaces 118 and 122 with space $S_1$ of FIG. 7D. Alternatively or additionally, the expansion is evident by looking at the hinge end voids 403. A majority of the hinge end voids 403 are now outside of the first ends 330 of the rotatable links 306 (e.g., between the first ends 330 and the second surfaces 120 and 124). This can be compared to FIG. 7D where a majority of the hinge end voids 403 are between the first ends 330 and the second surfaces 118 and 122.

In this particular implementation, the hinge expansion allows space $S_2$ to be equivalent to a thickness $S_3$ of the deployable assembly 202. This feature can further decrease the tendency of the deployable assembly to act as a fulcrum and can thereby decrease further force transfer to the hinge assembly 106(1) from forces 804. This aspect can still further reduce the likelihood of device failure from stress forces 804. Thus, the expandable hinge assembly (e.g., expandable device at the hinge end that engages the hinge assembly) can protect the device from damage and thereby enhance reliability and the user experience.

Individual elements of the hinge assemblies can be made from various materials, such as metals, plastics, and/or composites. These materials can be prepared in various ways, such as in the form of sheet metals, die cast metals, machined metals, 3D printed materials, molded or 3D printed plastics, and/or molded or 3D printed composites, among others, and/or any combination of these materials and/or preparations can be employed.

The present hinge assembly concepts can be utilized with any type of device, such as but not limited to notebook computers, smart phones, wearable smart devices, tablets, and/or other types of existing, developing, and/or yet to be developed devices.

Various methods of manufacture, assembly, and/or use for hinge assemblies and devices are contemplated beyond those shown above relative to FIGS. 1-8D.

Although techniques, methods, devices, systems, etc., pertaining to expandable hinge assemblies are described in language specific to structural features and/or methodological acts, it is to be understood that the subject matter defined in the appended claims is not limited to the specific features or acts described. Rather, the specific features and acts are disclosed as example forms of implementing the claimed methods, devices, systems, etc.

Various examples are described above. Additional examples are described below. One example includes a device comprising a first portion housing and a second portion housing. The first portion housing defining a first hinge end void of a first width and the second portion housing defining a second hinge end void of a second width and a hinge assembly rotatably coupling hinge ends of the first portion housing and the second portion housing. The hinge assembly having a third width in the first hinge end void that is less than the first width and having a fourth width in the second hinge end void that is less that the second width. The hinge assembly secured to the first housing by a first rotatable link that allows linear movement between the hinge assembly and the first portion housing within the first hinge end void, and the hinge assembly secured to the second housing by a second rotatable link that allows linear movement between the hinge assembly and the second portion housing within the second hinge end void.

Another example can include any of the above and/or below examples where the hinge assembly comprises a first hinge shaft and the first portion housing comprises a first hinge pin.

Another example can include any of the above and/or below examples where a first end of the first rotatable link rotates about the first hinge shaft and a second end of the first rotatable link rotates around the first hinge pin to allow the linear movement of the hinge assembly within the first hinge end void.

Another example can include any of the above and/or below examples where the hinge assembly comprises a second hinge shaft and the second portion housing comprises a second hinge pin.

Another example can include any of the above and/or below examples where a first end of the second rotatable link rotates about the second hinge shaft and a second end of the second rotatable link rotates around the second hinge pin to allow the linear movement of the hinge assembly within the second hinge end void.

Another example can include any of the above and/or below examples where the first hinge pin is positioned in an elongate slot in the first portion housing and wherein the first rotatable link and the first hinge pin can move perpendicular to the first portion housing along the elongate slot.

Another example can include any of the above and/or below examples where the device further comprises an orientation biasing assembly configured to bias the first portion housing to specific orientations relative to the second portion housing.

Another example can include any of the above and/or below examples where the specific orientations comprise 180 degrees.

Another example can include any of the above and/or below examples where the orientation biasing assembly operates on a first hinge shaft around which the first portion rotates.

Another example can include any of the above and/or below examples where the first hinge shaft defines a cam follower.

Another example can include any of the above and/or below examples where the orientation biasing assembly comprises a biasing arm that defines a cam that engages the cam follower of the first hinge shaft.

Another example can include any of the above and/or below examples where the device further comprises a biasing mechanism configured to bias the cam against the cam follower.

Another example can include any of the above and/or below examples where the biasing mechanism comprises a spring.

Another example can include any of the above and/or below examples where the spring is positioned between the first portion housing and the biasing arm.

Another example can include any of the above and/or below examples where linear movement occurs when the hinge end of the first portion housing experiences stress forces at the hinge assembly.

Another example can include any of the above and/or below examples where an extent of the linear movement is defined as a difference between the first width and the third width.

Another example includes a device comprising a first portion housing and a second portion housing, a hinge assembly positioned between the first portion housing and the second portion housing and comprising first and second rotatable links. The first rotatable link extending along a length from a first end that rotates around a first hinge axis to a second end that rotates relative to the first portion housing. The second rotatable link extending along a length from a first end that rotates around a second hinge axis to a second end that rotates relative to the second portion housing.

Another example can include any of the above and/or below examples where the second end of the first rotatable link rotates around a hinge pin fixed to the first portion housing.

Another example can include any of the above and/or below examples where the hinge pin is fixed directly to the first portion housing or wherein the hinge pin is fixed to an intermediary element that is fixed to the first portion housing.

Another example includes a device comprising a first portion housing and a second portion housing, a hinge assembly positioned between the first portion housing and the second portion housing and defining a hinge shaft, and a rotatable link extending along a length from a first end that rotates around the hinge shaft to a second end that rotates relative to the first portion housing to allow linear movement perpendicular to the hinge shaft between the first portion housing and the rotatable link.

The invention claimed is:

1. A device, comprising:
   a first portion housing and a second portion housing; and,
   a hinge assembly that comprises first and second hinge shafts a fixed distance from one another and that further comprises first and second rotatable links, a first end of the first rotatable link rotatably coupled to the first hinge shaft and a second end of the first rotatable link rotatably coupled to the first portion housing, a first end of the second rotatable link rotatably coupled to the second hinge shaft and a second end of the second rotatable link rotatably coupled to the second portion housing, wherein the first rotatable link and the second rotatable link allow the first and second housing portions to rotate through a range of orientations that includes a closed orientation, and wherein the first rotatable link and the second rotatable link allow a distance between the first portion housing and the second portion housing as measured between the first hinge shaft and the second hinge shaft to change when the first housing portion and the second housing portion are closed against an obstruction.

2. The device of claim 1, wherein the first housing portion comprises a first hinge pin and wherein the second end of the first rotatable link is positioned around the first hinge pin and wherein the second housing portion comprises a second hinge pin and wherein the second end of the second rotatable link is positioned around the second hinge pin.

3. The device of claim 1, wherein the first rotatable link comprises a first tension adjustment mechanism that controls an amount of friction between the first end of the first rotatable link and the first hinge shaft.

4. The device of claim 1, wherein the second rotatable link comprises a second tension adjustment mechanism that controls an amount of friction between the first end of the second rotatable link and the second hinge shaft.

5. The device of claim 2, wherein the first hinge pin is positioned in an elongate slot in the first portion housing and wherein the first rotatable link and the first hinge pin can move relative to the first portion housing along the elongate slot.

6. The device of claim 5, wherein the second hinge pin is positioned in an elongate slot in the second portion housing and wherein the second rotatable link and the second hinge pin can move relative to the second portion housing along the elongate slot.

7. The device of claim 1, further comprising an orientation biasing assembly configured to bias the first portion housing to specific orientations relative to the second portion housing.

8. The device of claim 7, wherein the specific orientations comprise 180 degrees.

9. The device of claim 7, wherein the orientation biasing assembly operates on the first hinge shaft around which the first portion rotates.

10. The device of claim 9, wherein the first hinge shaft defines a cam follower or wherein the first hinge shaft defines a cam.

11. The device of claim 10, wherein the orientation biasing assembly comprises a biasing arm that defines a cam or a cam follower that engages the cam or the cam follower of the first hinge shaft.

12. The device of claim 11, further comprising a biasing mechanism configured to bias the cam against the cam follower.

13. The device of claim 12, wherein the biasing mechanism comprises a spring.

14. The device of claim 13, wherein the spring is positioned between the first portion housing and the biasing arm.

15. The device of claim 1, wherein the distance increases when a hinge end of the first portion housing experiences stress forces at the hinge assembly.

16. The device of claim 15, wherein an extent of the increasing distance is defined at least in part by a width of the first end of the first rotatable link and a thickness of the first portion housing and a width of the first end of the second rotatable link and a thickness of the second portion housing.

17. A device, comprising:
a first portion housing and a second portion housing;
a hinge assembly positioned between the first portion housing and the second portion housing and comprising a communication member that defines first and second fixed hinge shafts and further comprising first and second rotatable links;
the first rotatable link extending along a length from a first end that rotates around the first hinge shaft to a second end that rotates relative to the first portion housing; and,
the second rotatable link extending along a length from a first end that rotates around the second hinge shaft to a second end that rotates relative to the second portion housing, the first and second rotatable links configured to allow a distance between the first portion housing and the second portion housing to change at a given orientation when stress forces are imparted on the first and second portion housings.

18. The device of claim 17, wherein the second end of the first rotatable link rotates around a hinge pin fixed to the first portion housing.

19. The device of claim 18, wherein the hinge pin is fixed to the first portion housing via an intermediary element that is fixed to the first portion housing.

20. A device, comprising:
a first portion housing and a second portion housing; and,
a hinge assembly defining first and second hinge shafts at a fixed distance apart, the hinge assembly coupling the first portion housing to the first hinge shaft and the second portion housing to the second hinge shaft so that the first and second portions can rotate relative to one another through a range of orientations and at an individual orientation a distance between the first and second portions as measured between the first and second hinge shafts can change depending upon stress forces imparted on the first and second portions.

* * * * *